April 3, 1945.    M. S. SPARKS    2,372,859
PACKAGE OF SOLDER
Filed Aug. 2, 1944
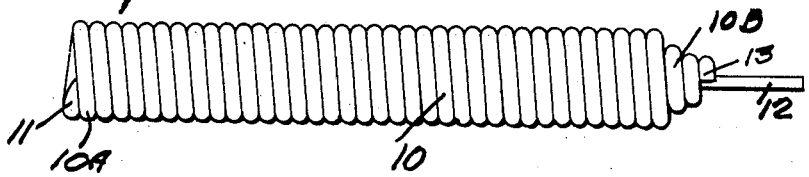
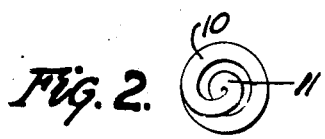
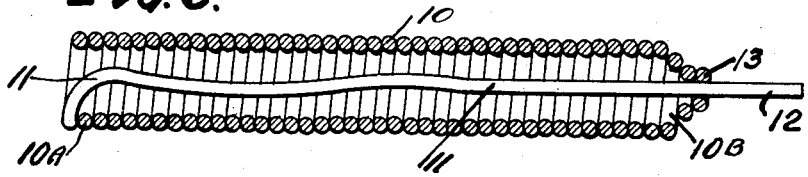
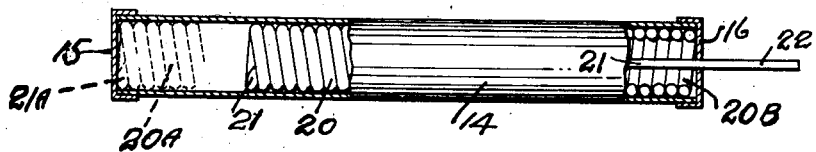
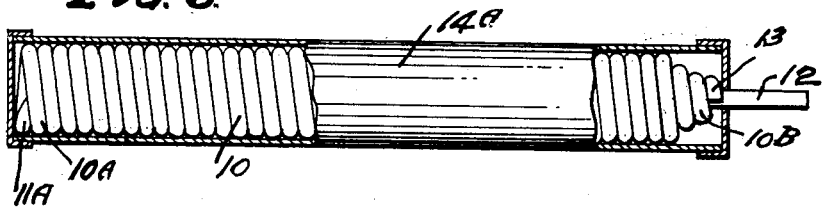
INVENTOR.
MARSHALL S. SPARKS
BY
J. H. Weatherford
Atty.

Patented Apr. 3, 1945

2,372,859

UNITED STATES PATENT OFFICE 2,372,859

PACKAGE OF SOLDER

Marshall S. Sparks, Memphis, Tenn.

Application August 2, 1944, Serial No. 547,727

5 Claims. (Cl. 206—52)

This invention relates to improvements in a convenient coil of strip solder, particularly that type of strip solder which is in the form of an inherently ductile wire, easily bent and having little resiliency. Preferably the solder so coiled is of that well known type which has a central core of fluxing material, but it will be understood that the particular type forms no portion of the present invention.

Solder for many uses is now formed into a wire shaped strip and packaged for sale by winding it on a spool. Under ordinary conditions some twelve or fifteen inches of length of the solder is withdrawn from the spool, and straightened into a slim rod. As this solder is used, the length of this rod rapidly shortens until such a short piece remains that the heat transferred from the soldering operation, prevents it further being held by the hand. Obviously then, the remaining strip must be held by a pair of pliers or the like, in order to use up the remainder of the strip cut off. Pliers, however, are often out of reach at the moment, with the net result that the unused portion is dropped and a new length put in use, the summation of these short lengths resulting in a large amount of waste.

The object of the present invention is to provide an elongated coil of such strip material, in which the material forms a handle from which the solder may be withdrawn for use by shortening the length of the coil without disturbing its transverse structure.

A further object of the invention is to form a coil of strip solder in which the coil forms a handle member which will dissipate the heat transferred through the strip of solder from the used end, and in which the larger proportion of the material is usable in proportion to the waste inherently occurring where the solder is cut into a plurality of short lengths for use, and each of these lengths is held directly by the hand.

The means by which the foregoing and other objects are accomplished, and the manner of their accomplishment, will readily be seen from the following specification on reference to the accompanying drawing, in which:

Fig. 1 is a side view of my improved coil of solder.

Fig. 2 is an end view of this coil.

Fig. 3 is a longitudinal section of the coil shown in Fig. 1.

Fig. 4 shows a slight modification in which the coil is enclosed in a container and further indicates the manner in which the coil shortens as the material is used.

Fig. 5 is a further modification similar to Fig. 4, in which the coil shown in Fig. 1 is enclosed in a container.

Referring now to the drawing in which the various parts are indicated by numerals:

10 is an elongated closely coiled body or handle portion, which may be formed by coiling a strip of the solder wire around a suitable mandrel. At one end 10A of the coil, a portion 11 of the solder wire or strip continuous with the coil is reversely bent, and as more particularly shown in Fig. 3, is disposed loosely within and through the coil 10, the end 12 of this strip projecting beyond the opposite end 10B of the coil. At such opposite end the coil is preferably conically converged until the final convolution 13 slidably, but still loosely, embraces the portion 11 as it emerges to form the projecting end 12.

In Fig. 4, 20 is a similar coil having a similar portion 21 extending loosely therethrough, and terminating in a projecting end 22. Enclosing this coil is a casing 14 which may be a pasteboard or metal tube, preferably closed at its two ends by heads 15, 16, the head 16 being apertured to permit the extension end 22 to project therethrough. This enclosed type of coil may conform identically to the form shown in Figs. 1 and 3, with the conically reduced end there shown, but since the head 16 forms an abutment, the coil end 20B may be of undiminished size and abut against such head.

In Fig. 5, 14A is a casing; 10 is a coil therein, this coil having an end portion 10B conically coiled convergingly into slidable engagement with the protruding end portion 12 of the strip.

It will be understood that the casing 14 may be reduced in thickness, such as that formed by wrapping a label around the coil, the heads in such case being omitted, but if so formed, that the coil preferably has the conical end.

The coil as usually formed for for shipment and sale ordinarily has a short projecting end only, preferably about the proportion shown in the drawing, and this end may be bent back against the coil should it be so desired, though such showing is not made.

In using the coil, the end 12 or 22 is pulled out a few inches, this accomplishing the shortening of the opposite end 10A of the coil, the portion 11 easily pulling downward through the coil to accomplish this. In Fig. 4, the original position of the coil is shown by the dotted lines 20A and the corresponding position of the portion 21 by the numeral 21A. After a portion of the material has been used, the coil 20 is reduced in length, one position being substantially as shown by the full lines in such figure. As the extending end 12 (or 22) is shortened by use, additional portions are drawn out, further shortening the coil until practically the entire length of the coil is used up, leaving only a minor portion, usually somewhat shorter than the conically converged end 10B. At such period of use, the remaining scrap is either discarded or is held by a suitable tool such as a pair of pliers and thereby used up.

It will be understood that the preferred form of the coil is a cylindrical one, but it is not my intention to limit the invention strictly to such form. In the form shown in Fig. 4, the casing 14 is preferably cylindrical. Should it be desired to make the coil 20 therewithin frictionally engage the casing, this may be done by making the coil slightly oval so it will distort the enclosing casing sufficiently to accomplish this engagement. This distortion may be so slight, however, that it need not even be noticeable, even in the coil or in the resulting package.

I claim:

1. An article comprising an inherently ductile strip of material as wire solder closely coiled helically in a single layer to form a hollow, elongated body, one end portion of said strip being reversely bent, loosely disposed through, and beyond the opposite end of said coil, said latter coil end being convergingly coiled into slidable engagement with said strip.

2. A package as of solder, comprising an inherently ductile strip of material closely wound helically to form a hollow, relatively much elongated substantially self-sustaining tubular shell, one end portion of said strip being inwardly bent from a first end of said shell, disposed through, and projecting for use longitudinally beyond the opposite end of said shell, being convergingly coiled into slidable engagement with said strip, and an enclosing member stiffening said shell.

3. An article, comprising a strip of material, as wire solder inherently capable of retaining its shape but pliable under stress, helically and closely coiled to form an elongated hollow shell, a continuation of said strip, at a first end of said shell, being reversely bent, loosely disposed through, and protruding for use beyond the opposite end of said shell, said latter shell-end being convergingly coiled into slidable engagement with said protruding strip; the diameter of said shell, as related to the cross section of said strip, being such as to permit subsequent further extension of said protruding end by withdrawal of additional increments from, and thereby shortening, said first end of said shell while maintaining the cross sectional shape of the remainder of said shell.

4. A package of material, as wire solder, inherently capable of retaining its shape, but pliable under stress, said package comprising a strip of such material helically and closely coiled to form an elongated hollow shell, and an enclosing member exteriorly stiffening said shell; a continuation of said strip at a first end of said shell being reversely bent, loosely disposed through, and protruding for use beyond the opposite end of said shell and said enclosing member, said latter shell end being converged to slidably embrace said strip, the diameter of said shell, as related to the cross section of said strip, being such as to permit subsequent further extension of said protruding end by withdrawal of additional increments from, and thereby shortening said first end of said shell while maintaining the cross sectional shape of the remainder of said shell.

5. An inherently ductile strip of wire solder, closely wound helically to form a hollow relatively much elongated, substantially pencil shaped and substantially self-sustained tubular shell, one end portion of said strip being inwardly bent from a first end of said shell, disposed through, and projecting for use longitudinally beyond the opposite end of said shell, said latter end of said shell being convergingly coiled into slidable engagement with said projecting strip.

MARSHALL S. SPARKS.